(12) United States Patent  (10) Patent No.: US 7,882,697 B2
Ichikawa  (45) Date of Patent: Feb. 8, 2011

(54) EXHAUST GAS PURIFICATION APPARATUS

(75) Inventor: Ataru Ichikawa, Kariya (JP)

(73) Assignee: Denso Corporation, Kariya (JP)

( * ) Notice: Subject to any disclaimer, the term of this patent is extended or adjusted under 35 U.S.C. 154(b) by 804 days.

(21) Appl. No.: 11/879,611

(22) Filed: Jul. 18, 2007

(65) Prior Publication Data

US 2008/0022670 A1  Jan. 31, 2008

(30) Foreign Application Priority Data

Jul. 27, 2006  (JP) ............................. 2006-204071
Mar. 15, 2007  (JP) ............................. 2007-067348

(51) Int. Cl.
 *F01N 3/00* (2006.01)
(52) U.S. Cl. ............................. 60/286; 60/295; 60/301; 60/303
(58) Field of Classification Search ................... 60/274, 60/286, 295, 297, 301, 303
See application file for complete search history.

(56) References Cited

U.S. PATENT DOCUMENTS

| | | | | |
|---|---|---|---|---|
| 6,041,594 | A * | 3/2000 | Brenner et al. | 60/309 |
| 6,279,603 | B1 * | 8/2001 | Czarnik et al. | 137/339 |
| 6,539,708 | B1 * | 4/2003 | Hofmann et al. | 60/286 |
| 7,448,206 | B2 * | 11/2008 | Meingast et al. | 60/286 |
| 7,497,077 | B2 * | 3/2009 | Dodge et al. | 60/286 |
| 7,584,604 | B2 * | 9/2009 | Masaki et al. | 60/286 |
| 7,788,907 | B2 * | 9/2010 | Koehler et al. | 60/286 |
| 2005/0013756 | A1 | 1/2005 | Amou et al. | |
| 2007/0035832 | A1 | 2/2007 | Hirata et al. | |

FOREIGN PATENT DOCUMENTS

| | | |
|---|---|---|
| DE | 100 60 808 | 7/2002 |
| DE | 101 28 414 | 12/2002 |
| DE | 10 2006 051788 | 5/2008 |
| DE | 10 2006 059507 | 6/2008 |
| EP | 1 712 754 | 10/2006 |
| JP | 2003-293739 | 10/2003 |
| JP | 2004-353523 | 12/2004 |

(Continued)

OTHER PUBLICATIONS

Office action dated Dec. 17, 2008 in German Application No. 10 2007 000375.9.

*Primary Examiner*—Binh Q Tran
(74) *Attorney, Agent, or Firm*—Harness, Dickey & Pierce, PLC (57) ABSTRACT

The exhaust gas purification apparatus includes an additive injection valve for injecting an additive from an injection orifice thereof into an exhaust gas passage through which an exhaust gas flows, and a catalyst disposed downstream of the additive injection valve for promoting an exhaust purification reaction using the additive to purify the exhaust gas. The exhaust gas purification apparatus is configured to inject-supplies, from the additive injection valve, the additive to the exhaust gas by the additive injection valve at upstream of the catalyst, and supply the catalyst with the injected additive together with the exhaust gas utilizing an exhaust flow of the exhaust gas so that the exhaust purification reaction is performed on the catalyst. The additive injection valve is mounted such that the additive is injected from the injection orifice toward an exhaust upstream side with respect to a direction orthogonal to an exhaust gas flow direction.

25 Claims, 7 Drawing Sheets

FOREIGN PATENT DOCUMENTS

| | | |
|---|---|---|
| JP | 2005-214171 | 8/2005 |
| JP | 2005-214172 | 8/2005 |
| JP | 2005-334681 | 12/2005 |
| WO | WO 2005028825 A1 * | 3/2005 ............ 60/286 |
| WO | WO 2005/073527 | 8/2005 |
| WO | WO 2007/083058 | 7/2007 |

* cited by examiner

EXHAUST GAS PURIFICATION APPARATUS

CROSS-REFERENCE TO RELATED APPLICATION

This application is related to Japanese Patent Applications No. 2006-204071 filed on Jul. 27, 2006, and No. 2007-67348 filed on Mar. 15, 2007, the contents of which are hereby incorporated by reference.

BACKGROUND OF THE INVENTION

1. Field of the Invention

The present invention relates to an exhaust gas purification apparatus for purifying exhaust gas by performing an exhaust gas purification reaction on a catalyst by use of a designated additive, as typified by the urea-SCR (selective reduction) system, and more specifically relates to an exhaust gas purification apparatus that promotes, through a catalyst, an exhaust gas purification reaction by use of an additive such as a urea solution injected from an additive injection valve, to thereby purify exhaust gas.

2. Description of Related Art

Various urea-SCR systems are under development with expectation of purifying NOx contained in exhaust gas at high purification rate for power plants, factories, vehicles (especially, diesel engine vehicles), etc., and some of them are in practical use. A structure of a conventional urea-SCR apparatus (system) as disclosed in Japanese Patent Application Laid-open No. 2003-293739 is explained below with reference to FIG. 17.

Figure 17:
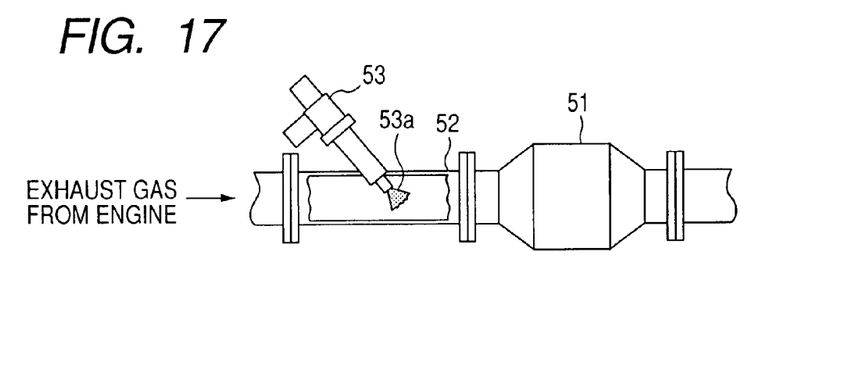
FIG. 17 is a diagram showing a structure of a typical conventional exhaust gas purification apparatus.

As shown in FIG. 17, this apparatus is constituted mainly by a catalyst 51 for promoting an exhaust gas purification reaction, an exhaust pipe 52 for guiding exhaust gas discharged from an exhaust gas emission source (internal combustion engine, for example) to the catalyst 51, and an additive injection valve 53 disposed midway of the exhaust pipe 52 for injecting a urea solution as an additive into the exhaust gas flowing through the exhaust pipe 52. The catalyst 51 is for promoting a reduction reaction (exhaust gas purification reaction) of NOx. The additive injection valve 53 is disposed with inclination with respect to the exhaust pipe 52 so that an injection orifice 53a thereof is directed to the side of the catalyst 51.

The apparatus having such a configuration operates to inject the urea solution into the exhaust gas flowing through the exhaust pipe 52 from the additive injection valve 53, and supply the catalyst 51 disposed downstream of the additive injection valve 53 with the urea solution together with the exhaust gas utilizing the flow of the exhaust gas in order to purify the exhaust gas through the reduction reaction of NOx on the catalyst 51. More particularly, the urea solution is hydrolyzed by the heat of the exhaust gas, as a result of which ammonia ($NH_3$) is produced, and this ammonia is added to NOx contained in the exhaust gas, which has been selectively adsorbed by the catalyst. And then, the NOx is reduced by the ammonia to be purified on the catalyst 51.

Generally, in such a urea-SCR apparatus, the efficiency of the exhaust gas purification reaction increases as the mixture rate of the ammonia produced by the hydrolysis of the urea solution to the exhaust gas to be purified increases. If the hydrolysis of the urea solution performed upstream of the catalyst 51 is insufficient, and accordingly the amount of the ammonia is not sufficient to purify (reduce) the NOx contained in the exhaust gas, the purification capacity of the urea-SCR apparatus is lowered, which causes exhaust emissions to increase. For example, this can occur when a vehicle provided with the urea-SCR apparatus is running at high speed while discharging a large amount of exhaust gas from its engine, causing the exhaust gas to flow at high speed. In this state, a time period between a moment at which the urea solution is injected and a moment at which the injected urea solution is added to the catalyst 51 is short. This make it difficult for the ammonia gas and the exhaust gas to sufficiently mix with each other so that ammonia is produced by an amount necessary to purify the NOx.

To cope with such a problem, there is proposed a urea-SCR apparatus having a long exhaust pipe for the purpose of increasing the distance between a position at which the urea solution (additive) is injected and a position at which the injected urea solution carried by the exhaust gas is added to the catalyst, to thereby provide a sufficiently long time period for the mixture and hydrolysis. There is also proposed a urea-SCR apparatus having a muffler carrying therein a hydrolysis catalyst, which is disposed upstream of the catalyst for the purpose of promoting the hydrolysis of the urea solution, and consequently promoting the production of ammonia.

However, the former apparatus has a problem in that it is unavoidable to upsize the system because of its long exhaust pipe. On the other hand, the latter apparatus has a problem in that the system increases in complexity, and significant design change on the overall system may be required.

SUMMARY OF THE INVENTION

The present invention provides an exhaust gas purification apparatus comprising:

an additive injection valve for injecting an additive from a first injection orifice thereof into an exhaust gas passage through which an exhaust gas flows; and a catalyst disposed downstream of the additive injection valve for promoting an exhaust purification reaction using the additive to purify the exhaust gas;

the exhaust gas purification apparatus being configured to inject-supplies, from the first additive injection valve, the additive to the exhaust gas by the additive injection valve at upstream of the catalyst, and supply the catalyst with the injected additive together with the exhaust gas utilizing an exhaust flow of the exhaust gas so that the exhaust purification reaction is performed on the catalyst, wherein the additive injection valve is mounted such that the additive is injected from the first injection orifice toward an exhaust upstream side with respect to a direction orthogonal to an exhaust gas flow direction.

The present invention also provides an exhaust gas purification apparatus comprising:

an additive injection valve for injecting an additive from at least one injection orifice thereof into an exhaust gas passage through which an exhaust gas flows; and a catalyst disposed downstream of the additive injection valve for promoting an exhaust purification reaction using the additive to purify the exhaust gas;

the exhaust gas purification apparatus being configured to inject-supplies, from the additive injection valve, the additive to the exhaust gas at upstream of the catalyst, and supply the catalyst with the injected additive together with the exhaust gas utilizing an exhaust flow of the exhaust gas so that the exhaust purification reaction is performed on the catalyst, wherein the additive injection valve is mounted such that a center line of spray of the additive injected from the injection orifice extends toward an exhaust upstream side with respect to a direction orthogonal to an exhaust gas flow direction.

According to the present invention, it is possible to provide a urea-SCR system that can promote the mixture between the urea solution and the exhaust gas to obtain a mixing rate high enough to sufficiently purify the exhaust gas, and to promote the hydrolysis of the urea solution to produce the ammonia by an amount necessary to sufficiently purify the exhaust gas, while making the system simple in structure and compact in size.

The additive injection valve may be configured to control an amount of the additive injected toward the exhaust upstream side by causing a valve body thereof to seat on and unseat from a seat section thereof, the seat section being located in the vicinity of the first injection orifice.

The additive injection valve may be configured to control an amount of the additive injected toward the exhaust upstream side by causing a valve body thereof to seat on and unseat from a seat section thereof, the seat section being located in the vicinity of an inner wall surface of the exhaust gas passage.

The additive injection valve may have a housing containing therein a valve mechanism including the valve body and the sheet section, the housing being directly mounted to an inner wall surface of the exhaust gas passage.

The additive injection valve may have a housing containing therein a valve mechanism including the valve body and the sheet section, the housing being directly mounted to an inner wall surface of the exhaust gas passage.

The additive injection valve may be is fixed to the exhaust gas passage so that an injection direction of the additive is kept constant, the first injection orifice opening toward the exhaust upstream side.

The additive injection valve may further include a second injection orifice formed therein so as to open toward an exhaust downstream side.

The first injection orifice may open in a direction opposite to the exhaust gas flow direction.

The additive injection valve may have a nozzle formed with the first injection orifice at a tip thereof, and inserted into the exhaust gas passage, the nozzle being curved within the exhaust gas passage such that the first injection orifice opens in a direction opposite to the exhaust gas flow direction.

The first injection orifice may open in a direction opposite to the exhaust gas flow direction, and the second orifice may open in the exhaust gas flow direction.

The additive injection valve may have a nozzle formed with the first and second injection orifices at a sidewall thereof, and inserted into the exhaust gas passage such that the first injection orifice opens in a direction opposite to the exhaust gas flow direction, and the second injection orifice opens in the exhaust gas flow direction.

The additive injection valve may be mounted such that the additive is injected in a direction against gravity toward the exhaust upstream side.

The additive injection valve may be mounted such that the additive is injected in a horizontal direction toward the exhaust upstream side.

The first and second orifices may be located in the vicinity of an inner surface wall of the exhaust gas passage so as to be opposed to each other, the additive being injected from the first and second orifices respectively in a horizontal direction toward the exhaust upstream side.

The first injection orifice may be located so as to be prevented from being directly exposed to the exhaust gas flow.

The first injection orifice may be located outside the exhaust gas passage.

The first injection orifice may be located in a branch passage branching from the exhaust gas passage.

The exhaust gas passage may be provided with a member partially blocking the exhaust gas flow at the upstream of the first injection orifice.

The exhaust gas passage may be provided with a member for forcibly changing the exhaust gas flow direction toward the first injection orifice.

The exhaust gas purification apparatus of the invention may further comprise a cooling device for cooling a predetermined portion of the additive injection valve.

The exhaust gas purification apparatus of the invention may further comprising a PM removing filter located upstream of the additive injection valve.

The additive may be a urea solution, and the catalyst may operate to promote a NOx reduction reaction in which NOx contained in the exhaust gas is reduced by ammonia produced by hydrolysis of the urea solution.

Other advantages and features of the invention will become apparent from the following description including the drawings and claims.

PREFERRED EMBODIMENTS OF THE INVENTION

Figure 1:
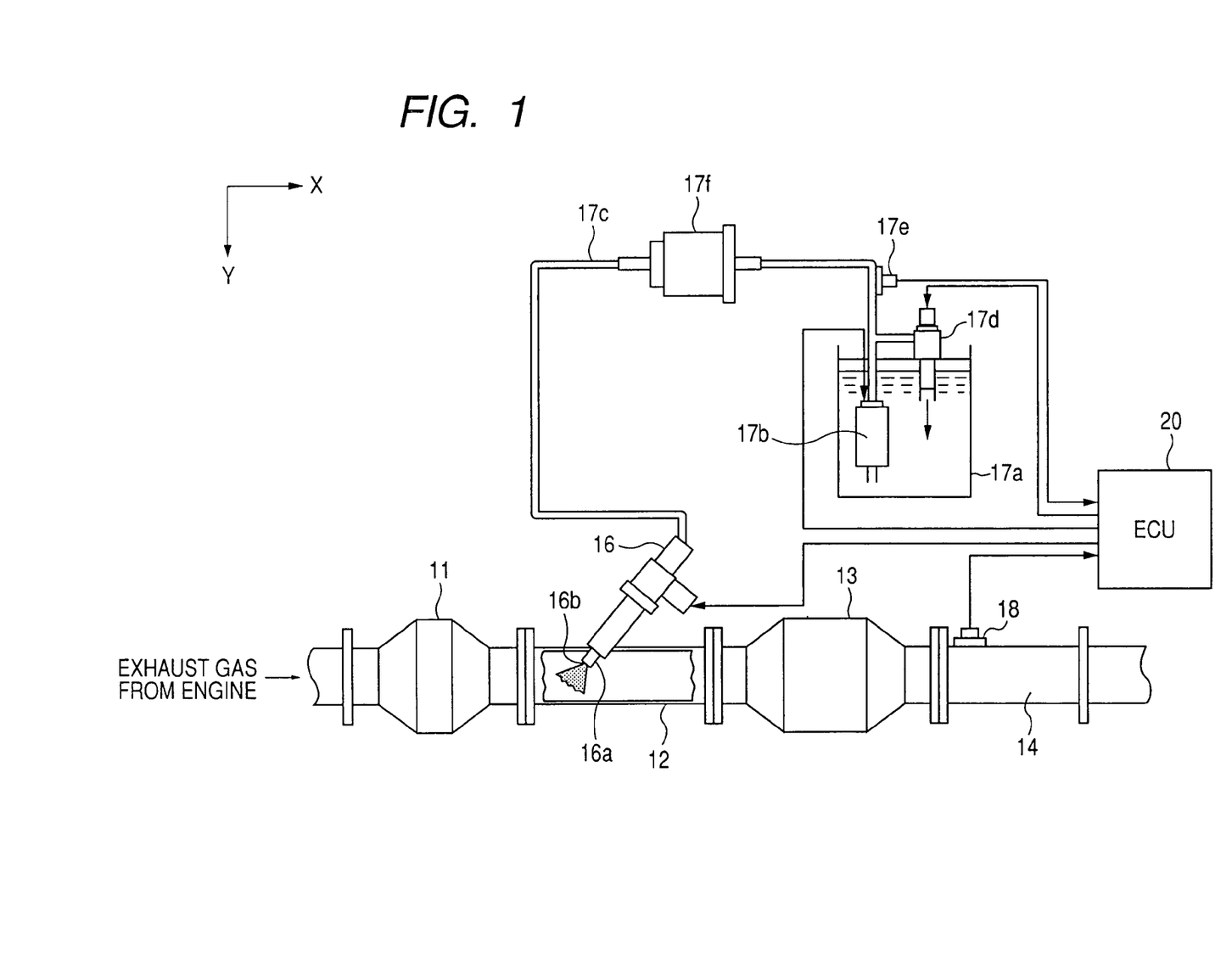
FIG. 1 is a diagram showing a structure of an exhaust gas purification apparatus according to an embodiment of the invention.

FIG. 1 is a diagram showing a structure of a urea-SCR system as an exhaust gas purification apparatus according to an embodiment of the invention. In FIG. 1, the arrow X represents a horizontal direction (X-direction), and the arrow Y represents a vertical direction or the gravitational direction (Y-direction).

This system, which is for purifying exhaust gas discharged from a diesel engine mounted on a vehicle (not shown), includes various actuators, sensors, ECU (Electronic Control Unit) 20, etc.

More specifically, this system includes a DPF (Diesel Particulate Filter) 11, an exhaust pipe 12, a catalyst 13, an exhaust pipe 14 disposed in this order from the exhaust upstream side, and is configured to inject a urea solution into exhaust gas flowing through the exhaust pipe 12 between the DPF 11 and the catalyst 13 from an additive injection valve 16 disposed midway of the exhaust pipe 12. In this system, the catalyst 13 disposed downstream of the additive injection valve 16 is supplied with the injected urea solution together with the exhaust gas by utilizing the flow of the exhaust gas, so that a reduction reaction of NOx is performed on the catalyst 13, to thereby purify the exhaust gas.

The DPF 11 is a continuously regenerating type PM (Particulate Matter)-removing filter that can be used continuously by burning off the collected PM periodically, for example, by performing post fuel injection after main fuel injection. The DPF 11 carries a platinum-based oxidation catalyst, so that it can remove SOF (Soluble Organic Fraction), which is one of PM fractions, together with HC and CO.

The catalyst 13 is for promoting reduction reactions (exhaust purification reactions) of NOx as indicated below.

(1)

(2)

(3)

The additive injection valve 16 mounted midway of the exhaust pipe 12 disposed upstream of the catalyst 13 inject-supplies ammonia (NH3) as a reducing agent for these reactions.

Figure 2:
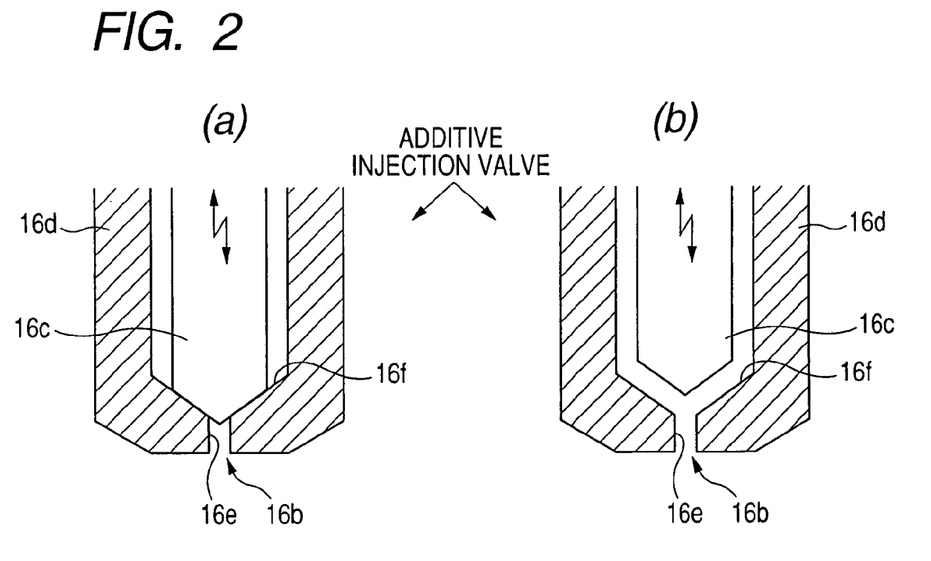
FIG. 2 is a diagram schematically showing the internal structure of an additive injection valve used in the exhaust gas purification apparatus of this embodiment.

The additive injection valve 16 has a nozzle (narrow tube) 16a formed with an injection orifice 16b at its tip, which serves as an injection channel of the additive. The injection orifice 16b may be constituted by a plurality of micro nozzle holes (a group of nozzle holes), or by only one nozzle hole. FIG. 2 shows the detailed structure of the additive injection valve 16.

The additive injection valve 16 is an inwardly open valve. In this embodiment, it is configured as a normally closed type valve which is placed in a closed state as shown in (a) of FIG. 2 when it is not energized, and placed in an open state as shown in (b) of FIG. 2 when it is energized. The additive injection valve 16 has a needle 16c as a valve body that reciprocates up and down within a valve barrel (housing 16d) in accordance with the energization state of a solenoid coil (not shown) located behind the needle 16c as a driver of the needle 16c. By the reciprocating motion of the needle 16c, the additive supply channel opening to a nozzle hole 16e is opened and closed at a tapered sheet section 16f located in the vicinity of the injection orifice 16b. That is, the needle 16c is driven by the solenoid coil to reciprocate within the housing 16d to seat on the sheet section 16f ((a) in FIG. 2), or unseats from the seat section 16f ((b) in FIG. 2). The motion of the needle 16c is PWM (Pulse Width Modulation)-controlled on the basis of a pulse signal (pulsed energization signal) which the ECU 20 sends to the driver (solenoid coil). The lift of the needle 16c (the distance to the sheet section 16f) can be variably controlled by adjusting the pulse width of the pulse signal. As the pulse width becomes long, the lift of the needle valve 16c becomes large, and as a result, the injection rate (the amount of the additive injected per unit time) becomes large. As explained above, the additive injection valve 16 is so configured that the amount of the additive injected to the exhaust upstream side with respect to the direction orthogonal to the exhaust gas flow can be adjusted by causing the needle 16c to seat on and unseat from the sheet section 16f.

The additive injection valve 16 operating to inject (atomize) the additive from the injection orifice 16b is supplied with the urea solution from a urea tank 17a (see FIG. 1). A pump 17b installed in the urea tank 17a draws the urea solution and delivers it to the additive injection valve 16 through a pipe 17c.

There provided a urea-pressure regulator 17d, a urea-pressure sensor 17e, and a filter 17f on the midway of the pipe 17c. The urea solution delivered from the pump 17b is filtered by the filter 17f so that foreign objects contained in the urea solution are removed, and then supplied to the additive injection valve 16. The urea-pressure sensor 17e is for detecting the supply pressure of the urea solution to the additive injection valve 16, and the urea-pressure regulator 17d is for regulating the supply pressure. When the supply pressure exceeds a predetermined value, the urea solution in the pipe 17c is returned to the urea-water tank 17a by the regulator 17d.

The additive injection valve 16 is mounted with inclination with respect to the exhaust pipe 12 as in the case of the afore-described conventional system. However, in this system, the additive injection valve 16 is inclined with respect to the exhaust pipe 12 such that the urea solution is injected to the exhaust upstream side. The additive injection valve 16 is inserted into a mounting hole formed in the exhaust pipe 12 which is located directly above the axis center of the exhaust pipe, such that the housing 16 containing therein the valve mechanism of the additive injection valve 16 including the sheet section 16f is located in the vicinity of the inner wall surface of the exhaust pipe 12. The additive injection valve 16 is fixed to the exhaust pipe 12 in such a state that the injection orifice 16b is located on the axis center of the exhaust pipe 12 and is directed to the exhaust upstream side (to the opposite side of the catalyst 13). Accordingly, the urea solution is injected to the exhaust upstream side with respect to the direction orthogonal to the exhaust gas flow (the direction parallel to the Y-direction), and downwardly (in the gravitational direction, or the Y-direction) with respect to the horizontal direction (the direction parallel to the X-direction). It is preferable that the injection angle (back and forth and left and right) of the additive injection valve 16 is set at an optima value determined taking into consideration the state of turbulence occurred due to the injection of the additive, and the amount of the additive adhering to the inner wall surface of the exhaust pipe 12. Accordingly, the injection direction may be offset from the axis center of the exhaust pipe 12. Incidentally, it is also preferable that other parameters concerning the additive injection valve 16 such as injection pattern patterns (injection timings, injection frequency, etc.), spray shape, injection quantity, etc, are set at their optimal values or shape determined through experiment.

The exhaust pipe 14 located downstream of the catalyst 13 is provided with an exhaust sensor 18 incorporating therein a NOx sensor and an exhaust temperature sensor, so that a NOx concentration in the exhaust gas (consequently, the purification rate of the catalyst 13), and the temperature of the exhaust gas can be measured at the downstream of the catalyst 13. An ammonia-removing device (oxidation catalyst, for example) for removing residual ammonia, and an ammonia sensor for detecting ammonia concentration in the exhaust gas may be provided at further downstream of the exhaust pipe 14 as necessary.

The ECU 20 performs controls related to the exhaust purification with the above described system. The ECU 20, which is a microcomputer-based unit, manipulates various actuators including the additive injection valve 16 on the basis of outputs of various sensors, so that various controls related to the exhaust purification are performed in keeping with each other. For example, the ECU 20 controls the energization time of the additive injection valve 16 and the output power of the pump 17b in order that the urea solution is injected at proper timings and by proper amount.

This embodiment is not different from the conventional apparatus shown in FIG. 17 in that the urea solution is injected from the additive injection valve into the exhaust gas flowing through the exhaust pipe, and the catalyst disposed downstream of the additive injection valve is supplied with the injected urea solution together with the exhaust gas by utilizing the flow of the exhaust gas, so that reduction reactions of NOx are performed on the catalyst, to thereby purify the exhaust gas. The urea solution is hydrolyzed by the heat of the exhaust gas by the following reaction, for example.

$$(NH_2)2CO + H_2O \rightarrow 2NH_3 + CO_2 \quad (4)$$

As a result, ammonia (NH3) is produced, and this ammonia is added to NOx contained in the exhaust gas, which has been selectively adsorbed by the catalyst. And then, the NOx is reduced by the ammonia to be purified on the catalyst by the above described reduction reactions (1) to (3).

Figure 3A:
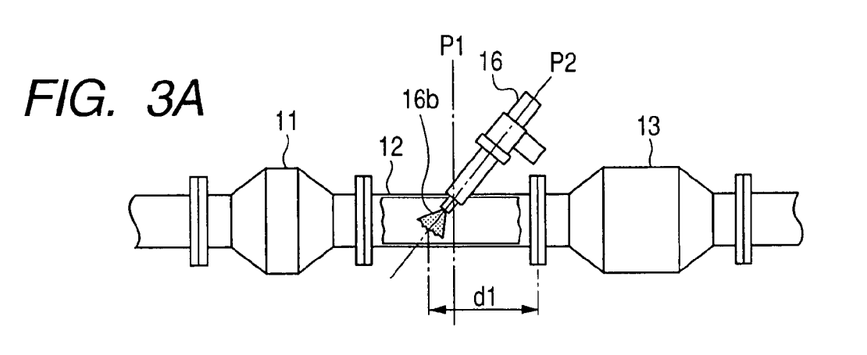
FIGS. 3A and 3B are diagrams explaining the operations of the exhaust gas purification apparatus of this embodiment and a comparable conventional exhaust gas purification apparatus.
Figure 3B:
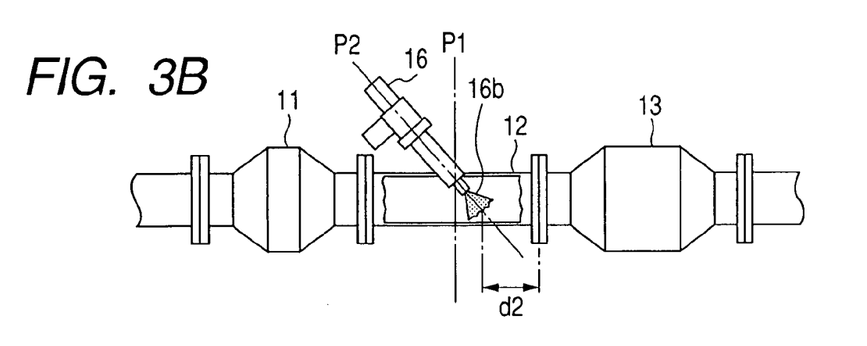
Figure 4A:
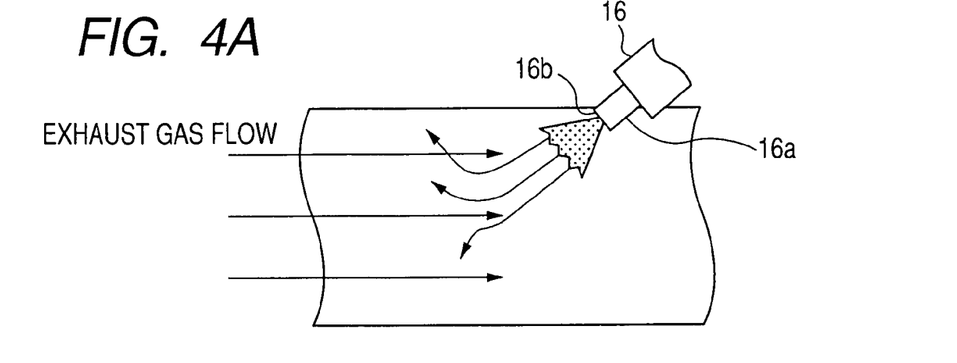
FIGS. 4A and 4B are diagrams explaining the operations of the exhaust gas purification apparatus of this embodiment and the comparable conventional exhaust gas purification apparatus.
Figure 4B:
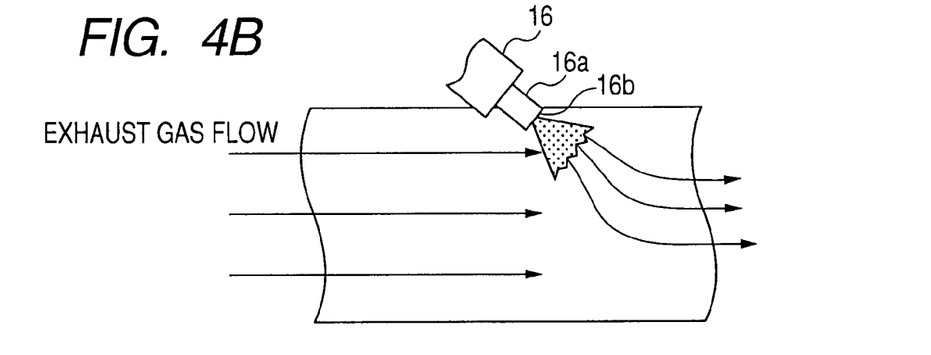

Next, the operation of the urea-SCR system (exhaust gas purification apparatus) of this embodiment is explained with reference to FIGS. 3A, 3B and FIGS. 4A, 4B. FIG. 3A, and FIG. 4A are diagrams for explaining the operation of exhaust gas purification apparatus of this embodiment. FIG. 3B, and FIG. 4B are diagrams for explaining the operation of a modified version of the exhaust gas purification apparatus in which the injection valve 16 is mounted such that the injection orifice 16b is directed to the exhaust downstream side (to the catalyst 13 side). Between these apparatuses, the mounting positions of the additive injection valve 16 are the same, and only the mounting orientations of the additive injection valve 16 are different. In FIGS. 3A, 3B, the dashed line P1 shows that the distance from the mounting position of the additive injection valve 16 to the catalyst 13 is the same between these apparatuses. Another dashed line P2 represents a center line of the spray (shown by hatched area in these figures) injected from the injection orifice 16b.

As shown in FIG. 3A, in the apparatus of this embodiment, the center line P2 of the spray extends toward the exhaust upstream side with respect to the direction orthogonal to the exhaust flow. On the other hand, as shown in FIG. 3B, in the modified version of this embodiment, the center line P2 of the spray extends toward the exhaust downstream side with respect to the direction orthogonal to the exhaust flow. The distance d1 between the position at which the urea solution is injected into the exhaust gas and the position at which the urea solution carried by the exhaust gas is added to the catalyst 13 in this embodiment shown in FIG. 3A is longer than that (distance d2) in the modified version of this embodiment shown in FIG. 3B. Accordingly, according to this embodiment, since the time period during which the ammonia produced by the hydrolysis of the urea solution is mixed with the exhaust gas to be purified is long, the mixture rate can be made high enough to sufficiently purify the exhaust gas. In addition, since the time period during which the urea solution is hydrolyzed in accordance with the reaction (4) is also long, it is possible to produce the ammonia by an amount necessary to sufficiently purify the exhaust gas.

In the modified version of this embodiment, as shown in FIG. 4B, in which the urea solution is injected to the exhaust downstream side, the injected urea solution is caught up in the exhaust flow, and reaches the catalyst 13 immediately. On the other hand, in this embodiment, as shown in FIG. 4A, since the urea solution is injected against the exhaust flow, the additive (urea solution) is well atomized by the collision between the additive and the exhaust flow, and the collision produces local turbulence, the additive is well mixed with the exhaust gas.

This embodiment described above offers the following advantages.

(1) The urea SCR system, which has the additive injection valve 16 injecting the urea solution (additive) from its injection orifice 16b into the exhaust pipe 12, and the catalyst 13 promoting the exhaust purification reaction (the reactions (1) to (3)) by use of the urea solution, and performs the exhaust purification reaction on the catalyst 13 by injecting the urea solution into the exhaust pipe 12 from the additive injection valve 16 at the upstream of the catalyst 13 and supplies the catalyst with the urea solution together with the exhaust gas, is so configured that the additive injection valve 16 injects the urea solution to the exhaust upstream side with respect to the direction (in the direction parallel to the Y-direction in FIG. 1) orthogonal to the exhaust gas flow. And the urea SCR system is so configured that the center line P2 of the spray injected from the additive injection orifice 16b of the injection valve 16 extends toward the exhaust upstream side with respect to the direction orthogonal to the exhaust flow. These makes it possible to promote the mixture between the urea solution and the exhaust gas to obtain a mixing rate high enough to sufficiently purify the exhaust gas, and to promote the hydrolysis of the urea solution to produce the ammonia by an amount necessary to sufficiently purify the exhaust gas, while making the apparatus simple in structure and compact in size.

(2) The structure of the additive injection valve 16 is such that the amount of the additive injected to the exhaust upstream side with respect to the direction orthogonal to the exhaust gas flow can be adjusted variably by causing the needle 16c to seat on and unseat from the sheet section 16f. And the sheet section 16f is located in the vicinity of the injection orifice 16. The pressure of the additive decreases with the distance from the sheet section 16f. However, since the sheet section 16f is located in the vicinity of the injection orifice 16, a sufficiently high injection pressure can be obtained irrespective of the drive force of the injection valve 16.

(3) The sheet section 16f is located in the vicinity of the inner wall surface of the exhaust pipe 12. This makes it possible to easily obtain a sufficiently high injection pressure, while suppressing the effect of the exhaust heat.

(4) The housing 16d containing the valve mechanism of the additive injection valve 16 is directly mounted to the wall surface of the exhaust pipe 12. If the sheet section 16f is located too close to the axis center of the exhaust pipe 12, there may arise deformation in the components of the additive injection valve due to exhaust heat, which may cause an actual injection amount of the additive to differ from a commanded amount of the additive. On the other hand, if the sheet section 16f is located too far from the exhaust pipe 12, it is difficult to obtain a sufficiently high injection pressure. These problems can be solved by mounting the additive injection valve 16 directly to the wall surface of the exhaust pipe 12. In addition, this makes it possible to ease the installation of the additive injection valve 16.

(5) The additive injection valve 16 is fixed to the exhaust pipe 12 so that the injection direction of the urea solution is kept constant, and the injection orifice 16b is directed to the exhaust upstream side with respect to the direction orthogonal to the exhaust flow. This makes it possible to inject the urea solution from the injection orifice 16b to the exhaust upstream side against the exhaust flow. In addition, since the additive injection valve itself is fixed, the performance of the valve becomes stable.

(6) The additive injection valve 16 is formed with only one injection orifice 16b directed to the exhaust upstream side. This simplifies the structure of the injection valve 16.

(7) The additive injection valve 16 is disposed downstream of the DPF 11 (PM removing filter) 11. This makes it possible to reduce contamination of the injection orifice 16b, so that the additive injection valve 16 can be used over a long span of time.

(8) As an additive to the catalyst 13, a urea solution is employed, and NOx reduction reactions (the reactions (1) to (3)) using ammonia produce by hydrolysis of the urea solution are promoted by the catalyst 13. This makes it possible to improve fuel consumption and PM of vehicles (especially diesel engine mounted vehicles), while allowing generation of NOx in combustion cycles.

(9) Generally, passenger cars are not provided with an air supply source used for adjusting brake pressure unlike large trucks. Accordingly, there has been a difficulty in providing the additive injection valve with a sufficiently high drive force when the urea SCR system is mounted on passenger cars. As described above, since the structure of the additive injection valve 16 of this embodiment makes it possible to obtain a sufficiently high injection pressure irrespective of the drive force of the additive injection valve 16, such a difficulty can be removed.

It is a matter of course that various modifications can be made to the above described embodiment as described below.

The sheet section does not necessary have to be located in the vicinity of the injection orifice.

Figure 5:
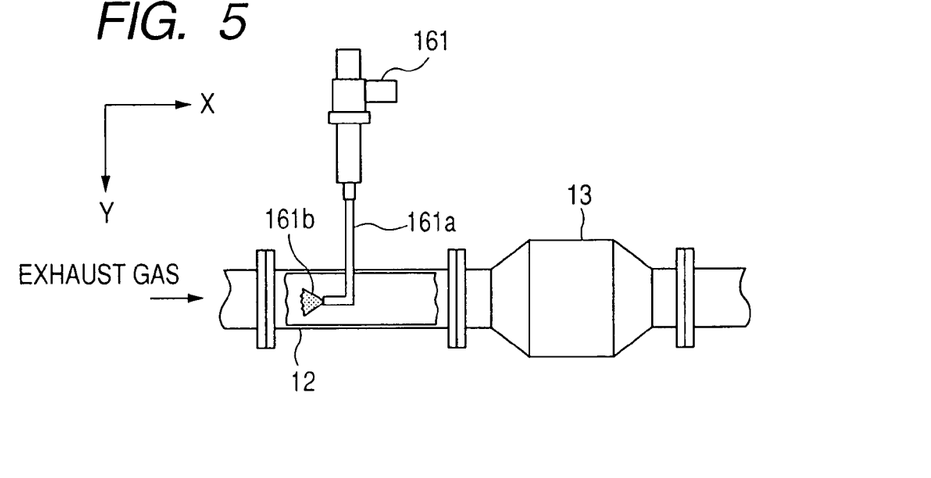
FIG. 5 is a diagram schematically showing the internal structure of a variant of the additive injection valve.

For example, as shown in FIG. 5, the additive injection valve 16 may be replaced by an additive injection valve 161 having a nozzle 161a longer than the nozzle 16a, and being configured such that the urea solution is injected against the exhaust flow from a injection orifice 161b of the nozzle 16 opening in the direction diametrically opposite to the exhaust flow. In this case, the additive injection valve 161 is mounted such that the nozzle 161a within the exhaust pipe 12 is curved at a right angle so that the injection orifice 161b is directed diametrically opposite to the exhaust flow. This configuration offers the following advantages in addition to the advantages of (1), and (5) to (9).

(10) Since the injection orifice 161b of the additive injection valve 161 is directed diametrically opposite to the exhaust flow, the injected urea solution receives a stronger resistance (pressure), atomization of the urea solution is further promoted, to thereby obtain the mixing rate high enough to further sufficiently purify the exhaust gas.

(11) Since the nozzle 161a is long, the adjustment of the injection position (especially in the depth direction) of the additive injection valve can be easily adjusted by adjustment of the insertion length of the nozzle. This also makes it possible to set the injection position on the axis center of the exhaust pipe 12 as shown in FIG. 5.

(12) The additive injection valve 161 is mounted such that the nozzle 161a is curved at a right angle within the exhaust pipe 12. This makes it possible to easily obtain the configuration that the injection orifice is directed diametrically opposite to the exhaust flow.

(13) The nozzle 161a is curved at a right angle within the exhaust pipe 12. This facilitates angle adjustment in mounting the additive injection valve such that its injection orifice is directed diametrically opposite to the exhaust flow.

It should be noted that the curvature of the nozzle 161a with in the exhaust pipe 12 does not necessarily have to be a right angel. When the curvature is not a right angle, the advantages of (10) to (12) may be obtained.

Figure 6:
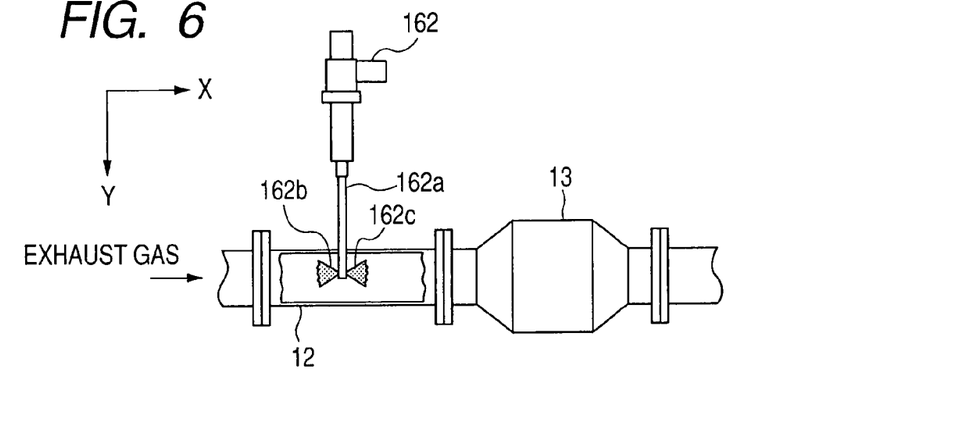
FIG. 6 is a diagram schematically showing the internal structure of another variant of the additive injection valve.

As shown in FIG. 6, the additive injection valve 16 may be replaced by an additive injection valve 162 having a nozzle (a straight long pipe) 162a longer than the nozzle 16a, and being configured such that the urea solution is injected from an injection orifice 162b opening in the direction opposite to the exhaust flow (in the anti-X-direction), and from another injection orifice 162c opening in the direction parallel to the exhaust flow (in the X-direction). This configuration offers the following advantages in addition to the advantages (1), and (5) to (12).

(14) Since the urea solution injected from the injection orifice 162b and the urea solution injected from the injection orifice 162c arrive at the catalyst 13 at different times, the purification efficiency at the catalyst 13 can be improved. In addition, since this configuration makes it possible to improve the purification efficiency without requiring a complicated injection timing control, production cost of the system can be reduced.

(15) Furthermore, according to the configuration shown in FIG. 6 where the two injection orifices 162b, 162c are provided in the side wall of the nozzle 162a of the additive injection valve 162 such that they open to the opposite directions with respect to each other, the structure of the additive injection valve 162 can be simplified.

(16) In addition, since the injection orifices 162b, 162c are disposed so as to opposite to each other, the pressures applied to them at the time of injection of the additive can be made substantially the same.

The injection orifices 162b, 162c do not necessarily have to be disposed so as to be sharply opposed to each other, and instead, they may be offset respectively. For example, the position of the injection orifice 162b may be shift upward or downward in the longitudinal direction of the nozzle 162a with respect to the injection orifice 162c.

Figure 7:
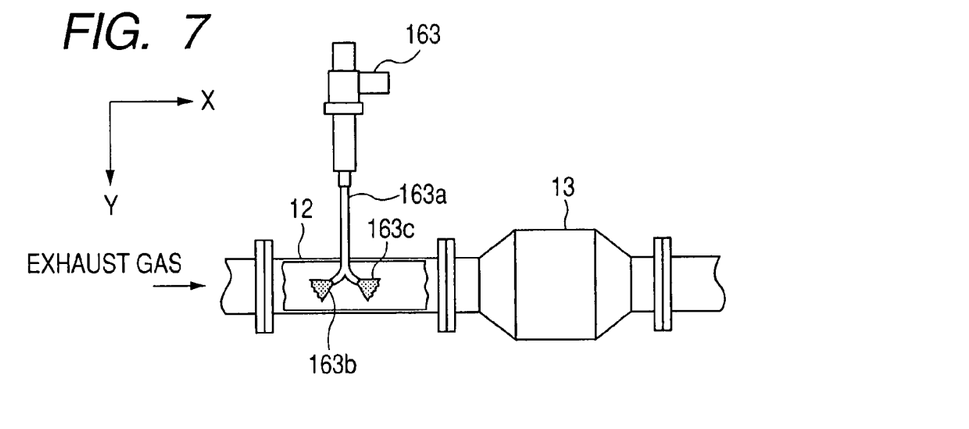
FIG. 7 is a diagram schematically showing the internal structure of another variant of the additive injection valve.

As shown in FIG. 7, the additive injection valve 16 may be replaced by an additive injection valve 163 having a nozzle 163a which bifurcates into two within the exhaust pipe 12, and being configured such that the urea solution is injected from an injection orifice 163b opening toward the exhaust upstream side with respect to the direction orthogonal to the exhaust flow, and an injection orifice 163c opening toward the exhaust downstream side with respect to the direction orthogonal to the exhaust flow. Also by this configuration, advantages similar to the advantages (1), (5) to (9), (11), and (14) can be obtained.

Figure 8:
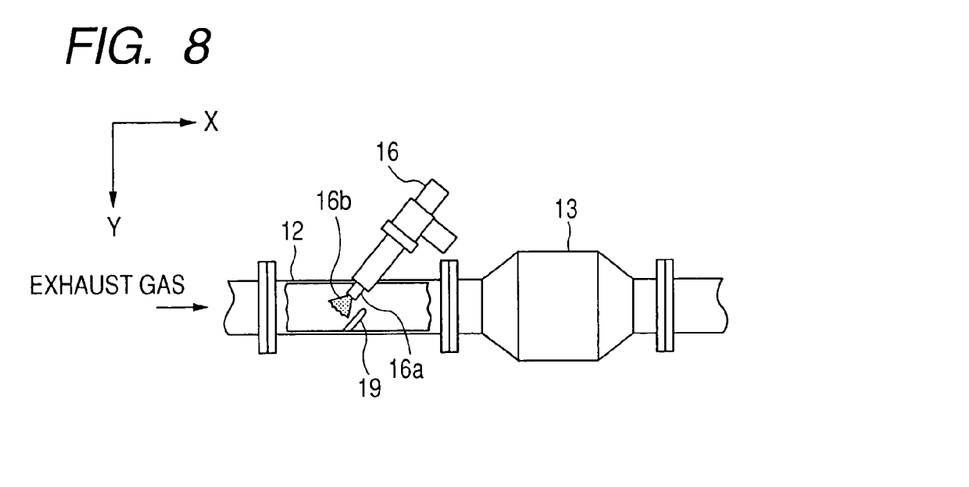
FIG. 8 is a diagram schematically showing the internal structure of another variant of the additive injection valve.

As shown in FIG. 8, the exhaust pipe 12 may be provided with an exhaust-flow-direction changing member 19 there inside that forcibly changes the direction of the exhaust flow toward the injection orifice 16b of the additive injection valve 16. The exhaust-flow-direction changing member 19 is fixed to the inner wall surface of the exhaust pipe 12 at the position of the injection orifice 16b of the additive injection valve 16, or the upstream of the injection orifice 16. When the exhaust flow hits the exhaust-flow-direction changing member 19, the direction thereof is changed toward the injection orifice 16b in accordance with the angle between the exhaust-flow-direction changing member 19 and the inner wall surface of the exhaust pipe 12. This configuration offers the following advantages in addition to the advantages (1) to (9).

It becomes easy to adjust the relationship between the direction of the exhaust flow and the injection angle of the additive injection valve 16.

Figure 9:
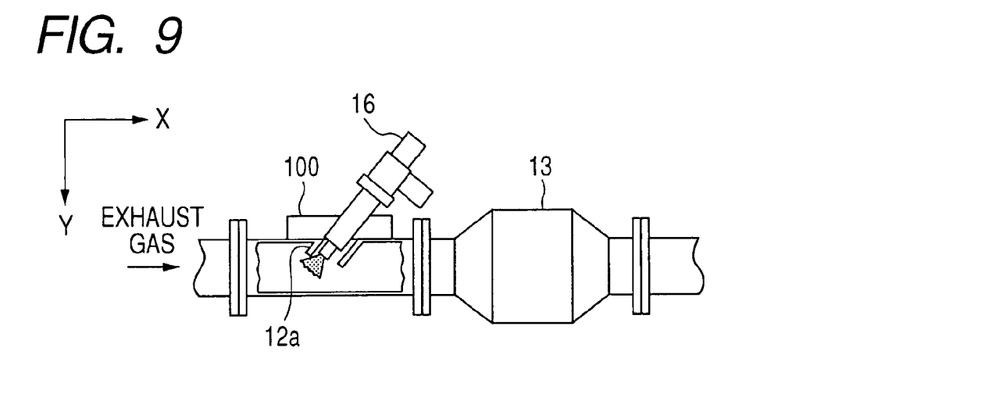
FIG. 9 is a diagram schematically showing the internal structure of another variant of the additive injection valve.
Figure 10:
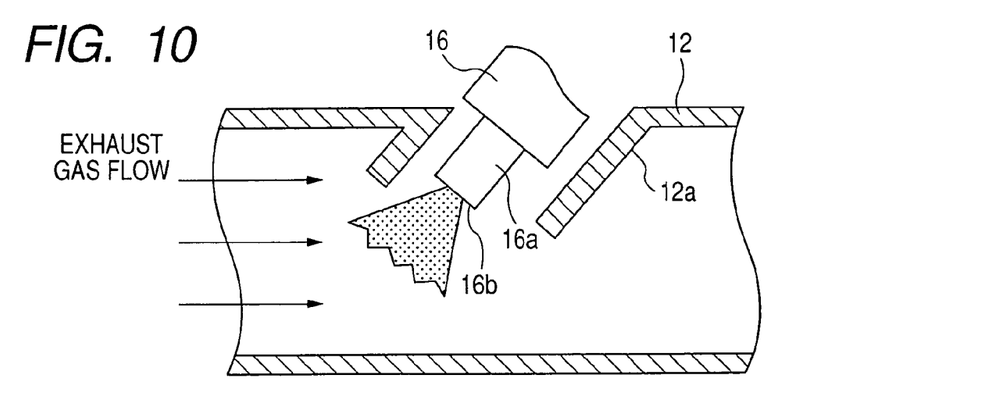
FIG. 10 is a diagram schematically showing the internal structure of another variant of the additive injection valve.

The structure of the exhaust-flow-direction changing member 19 is not limited to that shown in FIG. 8. For example, the exhaust-flow-direction changing member 19 may be movable in order to variably adjust the direction of the exhaust flow in accordance with the running state of the engine The additive injection valve may be mounted such that its injection orifice (at least one when it has a plurality of injection orifices) is not directly exposed to the exhaust flow. FIG. 9 and FIG. 10 show one example. FIG. 10 is a partially enlarged view of FIG. 9. In FIG. 9, the reference numeral 100 denotes a mounting member of the additive injection valve 16.

As shown in FIG. 9 and FIG. 10, this example has such a configuration that the additive is injected to the exhaust flow from the injection orifice 16b located in a branch pipe 12a provided in the exhaust pipe 12. The branch pipe 12a branching from the exhaust pipe 12 forms a tubular channel extending toward the exhaust upstream side within the exhaust pipe 12. In this configuration, since a portion of the branch pipe 12a located upstream of the injection orifice 16b serves as a member blocking the exhaust flow, the injection orifice 16b can be prevented from being directly exposed to the exhaust flow.

Figure 11:
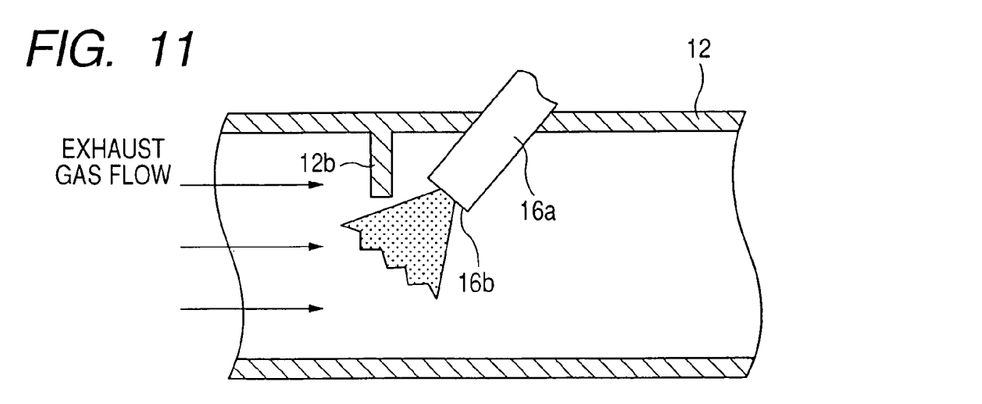
FIG. 11 is a diagram schematically showing the internal structure of another variant of the additive injection valve.

As shown in FIG. 11, it is also possible to block the exhaust flow by providing a plate-like protection wall 12b which is integral with the exhaust pipe 12 and projects inwardly within the exhaust pipe 12 at the upstream of the injection orifice 16b. This protection wall 12b may be provided separately from the exhaust pipe 12. The protection wall 12b may be made of material that allows part of the exhaust gas to pass therethrough. For example, the protection wall 12b may be made of a material having a mesh structure. Also, it may be provided with a filtering function as necessary.

Figure 12:
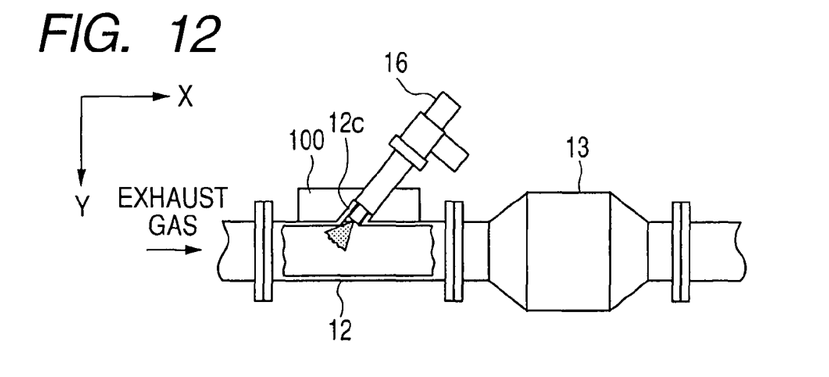
FIG. 12 is a diagram schematically showing the internal structure of another variant of the additive injection valve.
Figure 13:
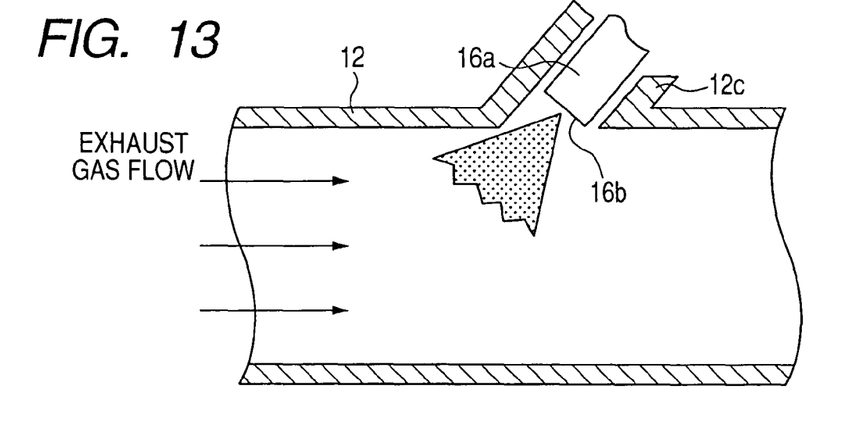
FIG. 13 is a diagram schematically showing the internal structure of another variant of the additive injection valve.

As shown in FIG. 12 and FIG. 13 which is a partially enlarged view of FIG. 12, a branch pipe 12c that branches from the exhaust pipe 12 so as to extend toward the exhaust downstream outside the exhaust pipe 12 may be provided. The branch pipe 12c forms a tubular branch in which the injection orifice 16b is located. In this case, since the additive is injected into the exhaust flow from outside the exhaust pipe 12, the injection orifice 16b can be prevented from being directly exposed to the exhaust flow.

These configurations make it possible to prevent the injection orifice and its vicinity from excessively rising in temperature due to exhaust heat. These configuration shown in FIGS. 10, 11, 13 may be combined as necessary. The aforedescribed long nozzle may be used in these configurations. However, since it is necessary to protect the sheet section of the additive injection valve from the exhaust heat, using the long nozzle is advantageous especially in a case where the sheet section is located in the vicinity of the injection orifice.

Figure 14:
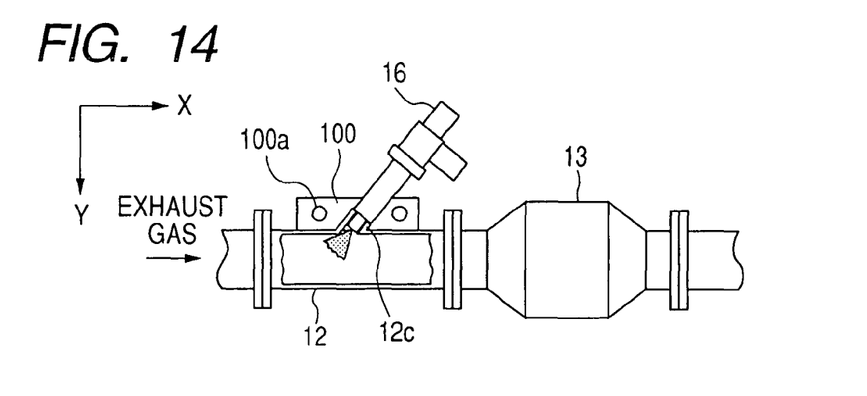
FIG. 14 is a diagram schematically showing the internal structure of another variant of the additive injection valve.

To secure heat resistance of the additive injection valve, it is effective to provide the additive injection valve with a cooling device. For example, as shown in FIG. 14, the mounting member 100 may be formed with a cooling water channel 100a to enable cooling the sheet section of the additive injection valve 16. The structure of the cooling device is not limited to the one shown in FIG. 14. The cooling device of the additive injection valve may be of the air-cooling type.

The mounting position of the additive injection valve 16, or 161 to 163 is not limited to such a position that the additive is injected along the gravitational direction (along the Y-direction)

Figure 15:
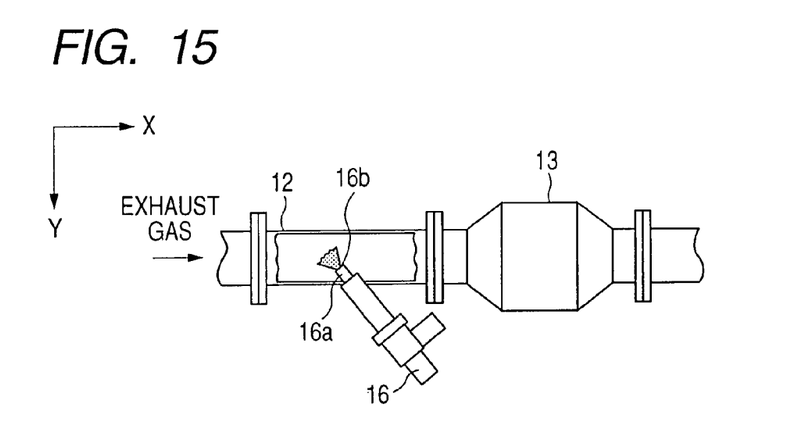
FIG. 15 is a diagram schematically showing the internal structure of another variant of the additive injection valve.

For example, as shown in FIG. 15, the additive injection valve 16 may be mounted in such a position that the additive is injected against gravity (anti-Y-direction). This configuration offers the following advantages in addition to the advantages (1) to (9).

(18) The urea solution (additive) injected from the additive injection valve 16 receives not only the resistance (pressure) of the exhaust flow, but also resistance due to gravity. This further promotes atomization of the urea solution, to thereby reliably obtain the mixing rate high enough to sufficiently purify the exhaust gas.

Figure 16A:
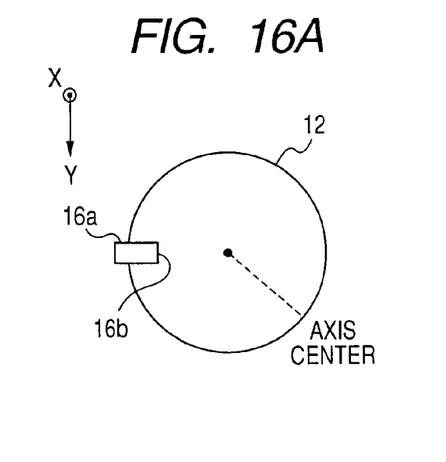
FIG. 16A is a diagram schematically showing the internal structure of another variant of the additive injection valve.
Figure 16B:
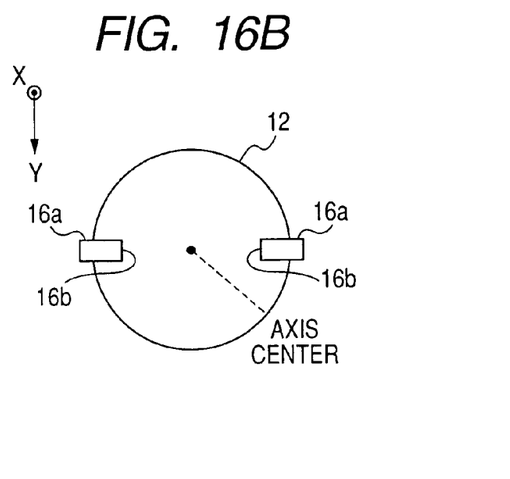
FIG. 16B is a diagram schematically showing the internal structure of another variant of the additive injection valve.

The additive injection valve may be mounted not directly above or directly below the axis center of the exhaust pipe 12, but transversely to the axis center, as shown in FIG. 16A, and FIG. 16B.

In the case shown in FIG. 16A, the additive is injected in the horizontal direction from the injection orifice 16b. This configuration eases the resistance due to gravity compared to the configuration shown in FIG. 1, or FIG. 15. This configuration is advantageous when there is limit to the power of the drive source prepared for the additive injection valve.

As shown in FIG. 16B, the additive may be injected in the horizontal direction toward the exhaust upstream side with respect to the direction orthogonal to the exhaust flow from two injection orifices 16b opposed to each other across the axis center of the exhaust pipe 12. According to this configuration, the additive can be injected uniformly, because the injections at the two injection orifices undergo the same gravity. The two injection orifices 16b may be ones of two nozzles bifurcating from the same additive injection valve. Alternatively, they may be ones of different injection valves.

When the configuration shown in FIG. 15 or FIG. 16 is employed, it is preferable that the injection angle of the additive injection valve 16 is set at an optimum value determined taking into consideration the state of turbulence occurred due to the injection of the additive, and the amount of the additive adhering to the inner wall surface of the exhaust pipe 12. Accordingly, the injection direction may be offset from the axis center of the exhaust pipe 12 as necessary.

The apparatus may be provided with any number of additive injection valves where appropriate. For example, as in the case of the apparatus shown in FIG. 16B, the apparatuses shown in FIG. 5 to FIG. 15 may have two or more injection valves according to need.

The configurations shown in FIGS. 5 to 14 can be applied to the apparatus shown in FIG. 15 where the additive is injected against gravity, and to the apparatus shown in FIG. 16 where the additive is injected in the horizontal direction.

It is preferable that the distance between the additive injection valve and the catalyst 13, and the depth position of the injection orifice of the additive injection valve (near the top inner wall surface, or near the bottom inner wall surface, or near the side inner wall surface, or near the axis center of the exhaust pipe) are set at their optimum value or position determined through experiment.

An ammonia production promoting device constituted by a muffler carrying therein a hydrolysis catalyst may be provided between the catalyst 13 and the additive injection valve.

It is known to use an air-assist type fuel injection valve being able to atomize fuel utilizing air pressure for a vehicle engine system. Such a technique may be applied to the above described embodiment in order to further promote atomization of the additive, if a necessary air supply source is available. In a case where the purification system as described above is mounted on a large truck, an air supply source mounted on this truck for adjusting brake pressure can be shared with such an air-assist type valve. In addition, since it is possible to provide a sufficiently high drive power for the additive injection valve in this case, the long nozzle as shown in FIG. 5 to FIG. 7 can be easily employed.

The additive injection valve may have any number of injection orifices. For example, the additive injection valve may be of the type radially injecting the additive.

It should be noted that any injection valve that can inject the additive the exhaust upstream side with respect to the direction orthogonal to the exhaust flow can offer the advantage (1). Even in a case where the additive injection valve is configured to turn in order to variably change its injection direction in accordance with the running state of a vehicle engine, if the additive is injected to the exhaust upstream side with respect to the direction orthogonal to the exhaust flow during at least one process of the turning operation of the additive injection valve, an advantage which is the same as, or similar to the advantage (1) can be obtained.

The above explained preferred embodiments are exemplary of the invention of the present application which is described solely by the claims appended below. It should be understood that modifications of the preferred embodiments may be made as would occur to one of skill in the art.

What is claimed is:

1. An exhaust gas purification apparatus comprising:
   an additive injection valve injecting an additive from a first injection orifice into an exhaust gas passage defined by an exhaust pipe through which an exhaust gas flows, the additive injection valve being mounted directly to said exhaust pipe; and
   a catalyst disposed downstream of said additive injection valve promoting an exhaust purification reaction using said additive to purify said exhaust gas;
   said exhaust gas purification apparatus being configured to inject-supply, from said first additive injection valve, said additive to said exhaust gas by said additive injection valve upstream of said catalyst, and supply said catalyst with said injected additive together with said exhaust gas utilizing an exhaust flow of said exhaust gas so that said exhaust purification reaction is performed on said catalyst,
   wherein a centerline of a flow passage through said additive injection valve is mounted at an acute angle with respect to an exhaust gas flow direction such that said additive is injected from said first injection orifice in a direction opposite to the exhaust gas flow direction.

2. The exhaust gas purification apparatus according to claim 1, wherein said additive injection valve is configured to control an amount of said additive injected toward said exhaust upstream side by causing a valve body thereof to seat on and unseat from a seat section thereof, said seat section being located in the vicinity of said first injection orifice.

3. The exhaust gas purification apparatus according to claim 1, wherein said additive injection valve is configured to control an amount of said additive injected toward said exhaust upstream side by causing a valve body thereof to seat on and unseat from a seat section thereof, said seat section being located in the vicinity of an inner wall surface of said exhaust gas passage.

4. The exhaust gas purification apparatus according to claim 2, wherein said additive injection valve has a housing containing therein a valve mechanism including said valve body and said seat section, said housing being directly mounted to an inner wall surface of said exhaust gas passage.

5. The exhaust gas purification apparatus according to claim 3, wherein said additive injection valve has a housing containing therein a valve mechanism including said valve body and said seat section, said housing being directly mounted to an inner wall surface of said exhaust gas passage.

6. The exhaust gas purification apparatus according to claim 1, wherein said additive injection valve is fixed to said exhaust gas passage so that an injection direction of said additive is kept constant, said first injection orifice opening toward said exhaust upstream side.

7. The exhaust gas purification apparatus according to claim 6, wherein said additive injection valve further includes a second injection orifice formed therein so as to open toward an exhaust downstream side.

8. The exhaust gas purification apparatus according to claim 1, wherein said first injection orifice opens in a direction opposite to said exhaust gas flow direction.

9. The exhaust gas purification apparatus according to claim 8, wherein said additive injection valve has a nozzle formed with said first injection orifice at a tip thereof, and inserted into said exhaust gas passage, said nozzle being curved within said exhaust gas passage such that said first injection orifice opens in a direction opposite to said exhaust gas flow direction.

10. The exhaust gas purification apparatus according to claim 7, wherein said first injection orifice opens in a direction opposite to said exhaust gas flow direction, and said second orifice opens in said exhaust gas flow direction.

11. The exhaust gas purification apparatus according to claim 10, wherein said additive injection valve has a nozzle formed with said first and second injection orifices at a sidewall thereof, and inserted into said exhaust gas passage such that said first injection orifice opens in a direction opposite to said exhaust gas flow direction, and said second injection orifice opens in said exhaust gas flow direction.

12. The exhaust gas purification apparatus according to claim 1, wherein said additive injection valve is mounted such that said additive is injected in a direction against gravity toward said exhaust upstream side.

13. The exhaust gas purification apparatus according to claim 1, wherein said additive injection valve is mounted such that said additive is injected in a horizontal direction toward said exhaust upstream side.

14. The exhaust gas purification apparatus according to claim 7, wherein said first and second orifices are located in the vicinity of an inner surface wall of said exhaust gas passage so as to be opposed to each other, said additive being injected from said first and second orifices respectively in a horizontal direction toward said exhaust upstream side.

15. The exhaust gas purification apparatus according to claim 1, wherein said first injection orifice is located so as to be prevented from being directly exposed to said exhaust gas flow.

16. The exhaust gas purification apparatus according to claim 15, wherein said first injection orifice is located outside said exhaust gas passage.

17. The exhaust gas purification apparatus according to claim 16, wherein said first injection orifice is located in a branch passage branching from said exhaust gas passage.

18. The exhaust gas purification apparatus according to claim 15, wherein said exhaust gas passage is provided with a member partially blocking said exhaust gas flow at the upstream of said first injection orifice.

19. The exhaust gas purification apparatus according to claim 1, wherein said exhaust gas passage is provided with a member for forcibly changing said exhaust gas flow direction toward said first injection orifice.

20. The exhaust gas purification apparatus according to claim 1, further comprising a cooling device for cooling a predetermined portion of said additive injection valve.

21. The exhaust gas purification apparatus according to claim 1, further comprising a PM removing filter located upstream of said additive injection valve.

22. The exhaust gas purification apparatus according to claim 1, wherein said additive is a urea solution, and said catalyst operates to promote a NOx reduction reaction in which NOx contained in said exhaust gas is reduced by ammonia produced by hydrolysis of said urea solution.

23. An exhaust gas purification apparatus comprising:
an additive injection valve injecting an additive from at least one injection orifice into an exhaust gas passage defined by an exhaust pipe through which an exhaust gas flows, the additive injection valve being mounted directly to said exhaust pipe; and
a catalyst disposed downstream of said additive injection valve promoting an exhaust purification reaction using said additive to purify said exhaust gas;
said exhaust gas purification apparatus being configured to inject-supply, from said additive injection valve, said additive to said exhaust gas upstream of said catalyst, and supply said catalyst with said injected additive together with said exhaust gas utilizing an exhaust flow of said exhaust gas so that said exhaust purification reaction is performed on said catalyst,
wherein a centerline of a flow passage through said additive injection valve is mounted at an acute angle with respect to an exhaust gas flow direction such that a center line of spray of said additive injected from said injection orifice extends in a direction opposite to the exhaust gas flow direction.

24. An exhaust gas purification apparatus comprising:
an additive injection valve injecting an additive from a first and a second injection orifice into an exhaust gas passage defined by an exhaust pipe through which an exhaust gas flows;
a catalyst disposed downstream of said additive injection valve promoting an exhaust purification reaction using said additive to purify said exhaust gas;
said exhaust gas purification apparatus being configured to inject-supply, from said first additive injection valve, said additive to said exhaust gas by said additive injection valve upstream of said catalyst, and supply said catalyst with said injected additive together with said exhaust gas utilizing an exhaust flow of said exhaust gas so that said exhaust purification reaction is performed on said catalyst,
wherein said additive injection valve is mounted such that said additive is injected from said first injection orifice in a first direction opposite to a direction of an exhaust gas flow and said additive is injected from said second injection orifice in the direction of said exhaust gas flow.

25. The exhaust gas purification apparatus according to claim 24, wherein said first direction is directly opposite to said direction of said exhaust gas flow and said second direction is directly in the direction of said exhaust gas flow.

* * * * *